US007497417B2

(12) United States Patent
Perham

(10) Patent No.: US 7,497,417 B2
(45) Date of Patent: Mar. 3, 2009

(54) CAMPER STABILIZATION SYSTEM

(75) Inventor: Walt Perham, 16869 Brickyard Rd., Bothell, WA (US) 98011

(73) Assignee: Walt Perham, Bothell, WA (US)

( * ) Notice: Subject to any disclaimer, the term of this patent is extended or adjusted under 35 U.S.C. 154(b) by 158 days.

(21) Appl. No.: 11/454,744

(22) Filed: Jun. 16, 2006

(65) Prior Publication Data

US 2006/0284146 A1 Dec. 21, 2006

Related U.S. Application Data

(60) Provisional application No. 60/690,935, filed on Jun. 16, 2005.

(51) Int. Cl.
*B60S 9/02* (2006.01)
*B60S 9/22* (2006.01)

(52) U.S. Cl. ....................... 254/45; 254/418; 280/763.1

(58) Field of Classification Search .................. 254/45, 254/46, 47, 48, 49, 50, 418, 419, 420, 421, 254/422, 423, 424, 425, 426, 427; 280/763.1
See application file for complete search history.

(56) References Cited

U.S. PATENT DOCUMENTS 2,232,187 A * 2/1941 Reid .......................... 280/431
2,571,067 A * 10/1951 Seckendorf ............. 254/133 R
3,096,065 A * 7/1963 Horn ....................... 248/354.3
3,164,371 A * 1/1965 Royle .......................... 254/45
3,201,087 A * 8/1965 Dalton ....................... 254/419
3,248,083 A * 4/1966 De Gennaro et al. .......... 254/47
3,305,216 A * 2/1967 De Gennaro et al. .......... 254/47
3,332,661 A * 7/1967 Hand ......................... 254/423
3,448,998 A * 6/1969 Abolins ................... 280/766.1
3,450,415 A * 6/1969 Martin ....................... 254/419
5,538,225 A * 7/1996 VanDenberg ............... 254/419
6,105,940 A * 8/2000 Charette ..................... 254/423

* cited by examiner

*Primary Examiner*—Joseph J Hail, III
(74) *Attorney, Agent, or Firm*—Graybeal Jackson LLP

(57) ABSTRACT

An embodiment of the invention is directed to camper having a four point jack system with a brace stabilization system. Typically, the camper includes four jacks anchored at four anchor points on the camper. The camper further includes one or more stabilization braces that provide an attachment between the base of the camper and one of the four jacks. In one embodiment, the stabilization braces may be anchored at a brace anchor point on the base of the camper such that the anchor point includes a tie rod with a swivel end. The braces may swivel to attach to a respective jack at any point along the jack.

10 Claims, 4 Drawing Sheets

CAMPER STABILIZATION SYSTEM

REFERENCE To RELATED APPLICATION

This application claims priority from U.S. Provisional Application 60/690,935 titled, "CAMPER STABILIZATION SYSTEM," which was filed on Jun. 16, 2005, and which is incorporated by reference.

BACKGROUND OF THE INVENTION

FIG. 1 shows an isometric view of a conventional camper 100 having a conventional four point jack system 110*a*-110*d* (the fourth jack 110*d* is not shown because of the isometric nature of the drawing). Such a conventional camper 100 may be engaged by a pick-up truck (not shown) by resting the camper in the pick-up truck's bed. Thus, a base portion 105 of the camper 100 rests on the floor of the truck bed and wheel well cavities 106*a* and 106*b* allow room for a truck beds rear wheel wells that may protrude into the truck bed. Engaging a conventional camper 100 with a truck in its truck bed is well known in the art and will not be discussed further herein.

Typically, a conventional camper 100 is equipped with a four point 110*a*-110*d* jack system such that each jack 110*a*-110*d* may be extended (via a telescoping mechanism that may be electrically, hydraulically, or manually cranked) to rest on the ground to assist is leveling and stabilizing the camper when the truck is parked. Further, the jacks 110*a*-110*d* may be extended enough to lift the camper 100 out of the truck bed such that the truck may drive away and the camper remains supported by the four jacks 110*a*-110*d* alone.

When resting solely on the four jacks 110*a*-110*d*, however, the stability of the camper 100 is compromised. When a person is in the camper and moving about, the entire camper 100 typically sways back and forth in a lateral manner. The lateral sway may be from side-to-side or front-to-back. Further, wind conditions may also cause instability and sway in the camper 100. As a result, a large amount of torque and stress is placed on the anchor points 115*a*-115*d* (again anchor point 115*d* is not shown because of the isometric nature of the drawing) of the individual jacks 110*a*-110*d*. This torque and stress often leads to anchor point fractures, cracks and flat-out breaks. Further, the physical integrity of the camper wall in which the anchor points 115*a*-115*d* becomes compromised through repeated and continuous stress due to swaying and instability.

Such problems caused by sway and instability that lead to failures at the anchor points are exacerbated over time such that the anchor points become weaker which may lead to less stability in a best-case scenario and to a flat-out break that may result in the camper 100 falling over and seriously injuring occupants or others near the camper 100 in a worst-case scenario. It would be beneficial to have a stabilization system that relieves the torque and stress placed on the anchor points 115*a*-115*d* for the jacks system 110*a*-110*d*.

SUMMARY OF THE INVENTION

An embodiment of the invention is directed to camper having a four point jack system with a brace stabilization system. According to one embodiment of the invention a camper stabilization system comprises a plurality of jacks operable to be coupled to a camper at respective coupling points, the plurality of jacks supporting the weight of the camper when coupled to the camper. The system further includes at least one first stabilization brace coupled to at least one jack and coupled to the camper such that the stabilization brace is coupled to a portion of the at least one jack other than the coupling point of the at least one jack to the camper and such that the stabilization brace is coupled to the camper at a point other than the coupling point of the at least one jack to the camper.

Typically, the camper includes four jacks anchored at four anchor points on the camper. The camper further includes one or more stabilization braces that provide an attachment between the base of the camper and one of the four jacks. In one embodiment, the stabilization braces may be anchored at a brace anchor point on the base of the camper such that the anchor point includes a tie rod with a swivel end. The braces may swivel to attach to a respective jack at any point along the jack.

Such a stabilization system provides additional stability to the camper by relieving the torque and stress placed upon the anchor pints for the jacks of the camper. Further, the amount of sway and instability experienced by a person inside the camper may be greatly reduced. The additional stability realized by providing braces between the jacks and the base of the camper is a further benefit in reducing repair costs that may ensue due to failures at anchor points on the camper.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following discussion is presented to enable a person skilled in the art to make and use the invention. The general principles described herein may be applied to embodiments and applications other than those detailed above without departing from the spirit and scope of the present invention. The present invention is not intended to be limited to the embodiments shown, but is to be accorded the widest scope consistent with the principles and features disclosed or suggested herein.

Figure 1:
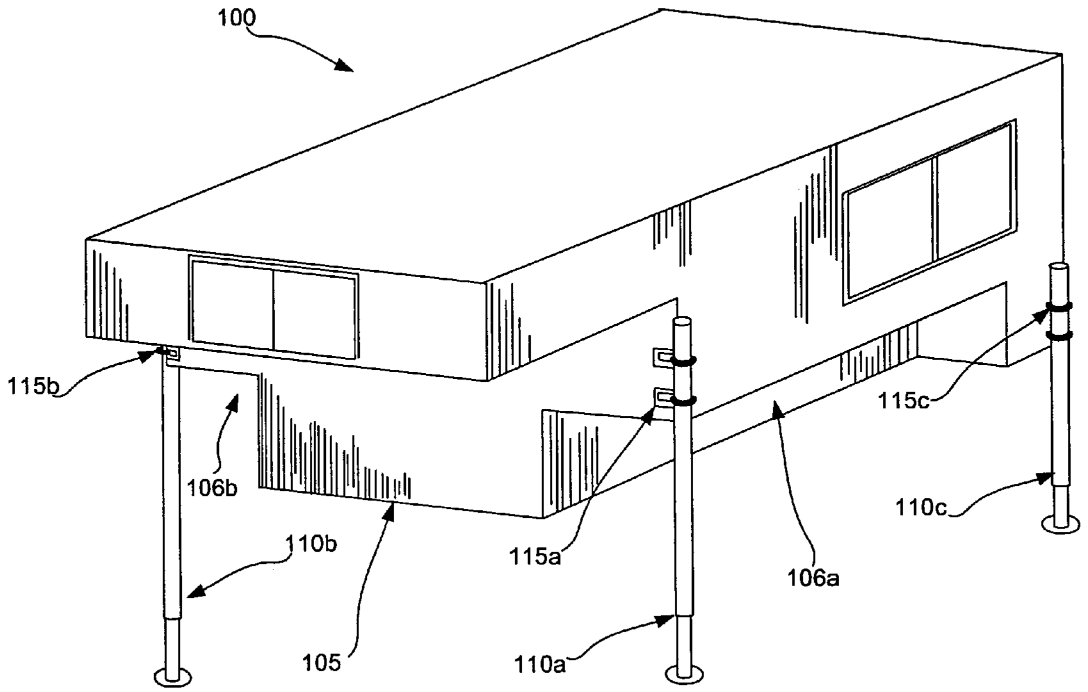
FIG. 1 (PRIOR ART)
FIG. 1 is an isometric view of a conventional camper having a conventional four point jack system.
Figure 2:
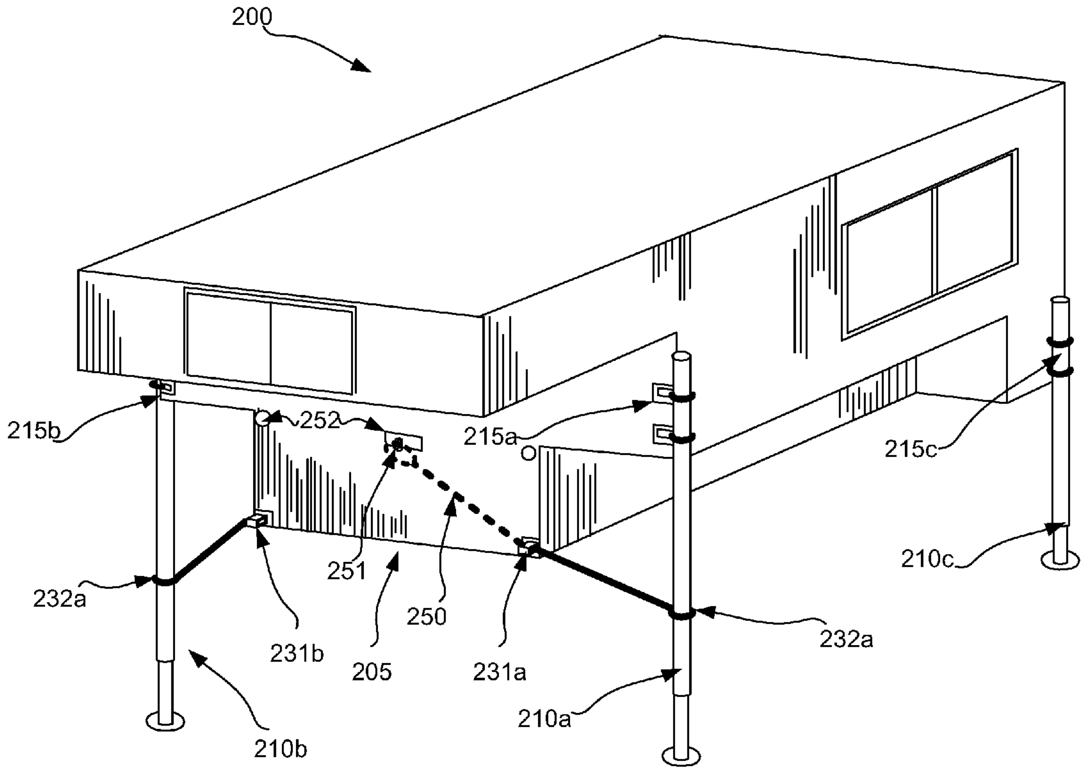
FIG. 2 is an isometric view of a camper having a four point jack system with a single brace stabilization system according to an embodiment of the invention.

FIG. 2 is an isometric view of a camper 200 having a four point jack system with a single brace stabilization system according to an embodiment of the invention. The camper 200 includes four jacks 210*a*-210*d* anchored at four anchor points 215*a*-215*d* on the camper 200. The camper 200 further includes at least one stabilization brace 230*a*. The embodiment shown in FIG. 2 shows two stabilization braces 230*a* and 230*b*. The stabilization braces 230*a* and 230*b* may be anchored at a brace anchor point 231*a* and 231*b* that may be a tie rod with a swivel end. The swivel end may further comprise a threaded screw portion to adjust the length. The brace 210*a* and 210*b* may swivel to attach to the jack 210*a* at any point along the jack, but typically above the telescoping mechanism of a typical jack 210*a*. The attaching means may be a clamping mechanism 232*a* or the like.

The stabilization braces 230*a* and 230*b* may typically comprise a rigid member that has a length that may extend between one of the jacks 210*a*-210*d* and some portion of the camper 200 such that a non-zero angle is formed between the stabilization brace and a jack. The rigid member may, in turn, comprise more than one member, such as a pair of bars in parallel or a first end and a second end coupled via a screw thread and bolt assembly. Such designs allow for each stabilization brace 230*a* and 230*b* to be fitted to the particular position that it is being used to support. Further, each stabilization brace 230*a* and 230*b* may be made of steel, iron, aluminum, rigid plastic, composite, alloy, or any other material suitable for the purposes of providing stable support.

Typically, the clamping mechanism 232*a* may be designed specifically for a particular kind of jack 210*a*, i.e., circular, square, etc. and may also be different sizes to match different jacks. As such, the clamping mechanism 232*a* may also be interchangeable at the end of the particular brace 230*a*. Thus, the brace 230*a* may be used with a number of different clamping mechanisms 232*a* depending on the jack system.

When not in use for stabilizing the camper 200, the stabilization brace 230*a* may be maneuvered to a storage position 250 and clipped (into a clipping mechanism 251) into place such that the brace 230*a* may not swivel away during travel. Further, the storage position may be recessed into the base of the camper 200 such that the stabilization braces 230*a* and 230*b* are stored flush with the contour of the base of the camper 200. The anchor points 231*a* and 231*b* may further include rubber stoppers or rubber gaskets 252 for preventing damage to the bed or cab or the pickup truck with which the camper 200 is engaged.

Although not shown, the rear jacks 210*c* and 210*d* may also include stabilization braces 230*a* and 230*b* to further assist with preventing sway in the camper 200.

The stabilization braces 230*a* and 230*b* may also be anchored to the jacks 210*a* and 210*b*, respectively, such that the swivel point is on the jacks 210*a* and 210*b* and the clamping mechanism is on the base of the camper 200. As such, during travel or storage, the stabilization braces 230*a* and 230*b* are swiveled to a parallel position with the jacks 210*a* and 210*b* and clipped to a holding mechanism (not shown) mounted on the jacks 210*a* and 210*b*.

Figure 3:
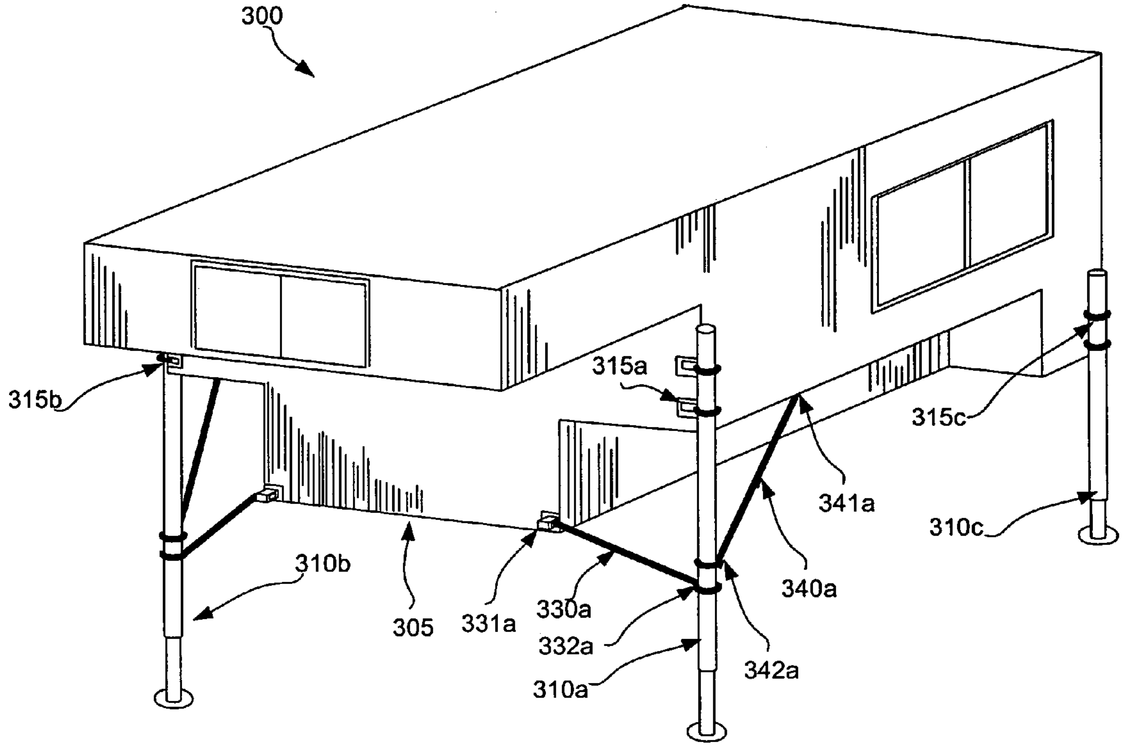
FIG. 3 is an isometric view of a camper having a four point jack system with a dual brace stabilization system according to an embodiment of the invention.

FIG. 3 is an isometric view of a camper 300 having a four point jack system with a dual brace stabilization system according to an embodiment of the invention. The camper 300 includes four jacks 310*a*-310*d* anchored at four anchor points 315*a*-315*d* on the camper 300. The camper 300 further includes at least one pair of stabilization braces 330*a* and 340*a*. The embodiment shown in FIG. 3 shows two pairs of stabilization braces 330*a*/340*a* and 330*b*/340*b*.

The stabilization braces 330*a* and 330*b* may be anchored at a brace anchor point 331*a* and 331*b* that may be a tie rod with a swivel end. The swivel end may further comprise a threaded screw portion to adjust the length. The brace 330*a* and 330*b* may swivel to attach to the jack 310*a* at any point along the jack, but typically above the telescoping mechanism of a typical jack 310*a*. The attaching means may be a clamping mechanism 332*a* or the like.

Similarly, the stabilization braces 340*a* and 340*b* may be anchored at a brace anchor point 341*a* and 341*b* that may be a tie rod with a swivel end. The swivel end may further comprise a threaded screw portion to adjust the length. The brace 340*a* and 340*b* may swivel to attach to the jack 310*a* at any point along the jack, but typically above the telescoping mechanism of a typical jack 310*a*. The attaching means may be a clamping mechanism 342*a* or the like.

When not in use for stabilizing the camper, the stabilization braces 330*a*/340*a* may be maneuvered to storage positions and clipped (into a clipping mechanism, not shown) into place such that the braces 330*a*/340*a* may not swivel away during travel. The anchor points 331*a*/341*a* and 331*b*/341*b* may further include rubber stoppers or rubber gaskets (not shown) for preventing damage to the bed or cab or the pickup truck with which the camper 300 is engaged.

Although not shown, the rear jacks 310*c* and 310*d* may also include stabilization braces to further assist with preventing sway in the camper 300.

Figure 4:
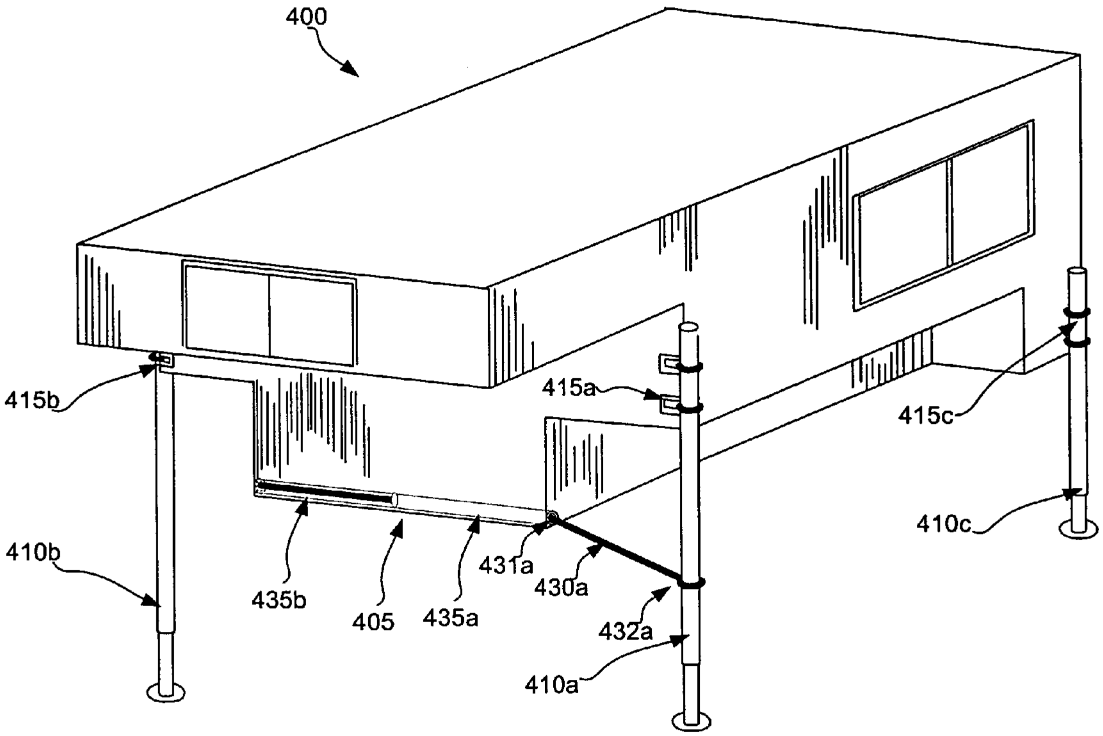
FIG. 4 is an isometric view of a camper having a four point jack system with a telescoping brace stabilization system according to an embodiment of the invention.

FIG. 4 is an isometric view of a camper 400 having a four point jack system with a telescoping brace stabilization system according to an embodiment of the invention. The camper 400 includes four jacks 410*a*-410*d* anchored at four anchor points 415*a*-415*d* on the camper 400. The camper 400 further includes at least one stabilization brace 430*a*. The embodiment shown in FIG. 4 shows two stabilization braces 430*a* and 430*b*.

The stabilization braces 430*a* and 430*b* may be anchored at a telescoping brace anchor point 431*a* and 431*b* that may include a storage tube 435*a* with a sliding anchoring mechanism. The anchor end may further comprise a sliding portion to adjust the length. The brace 430*a* and 430*b* may hook to or be pinned to attach to the jack 410*a* at any point along the jack, but typically above the telescoping mechanism of a typical jack 410*a*. The attaching means may be a clamping mechanism 432*a* or the like.

When not in use for stabilizing the camper, the stabilization braces 430*a*/440*a* may be maneuvered to storage positions within the storage tubes 435*a* and 435*b* and clipped (into a clipping mechanism, not shown) into place such that the braces 430*a*/440*a* may not be pulled out and/or swivel around during travel. The anchor points 431*a* and 431*b* may further include rubber stoppers or rubber gaskets (not shown) for preventing damage to the bed or cab or the pickup truck with which the camper 400 is engaged. Further, the storage tubes 435*a* and 435*b* are built in to the body of the camper such that the storage tubes 435*a* and 435*b* do not extend into the interior of the camper 400. Rather, the storage tubes 435*a* and 435*b* are tucked away under bench seating of inside the walls of the camper 400 such that the storage tubes 435*a* and 435*b* are nearly hidden when not in use.

Although not shown, the rear jacks 410*c* and 410*d* may also include stabilization braces to further assist with preventing sway in the camper 400.

In another embodiment of the invention, a camper may be manufactured that includes the stabilization system as part of the manufacturing and assembly process, The camper is typically operable to be engaged by a pickup truck bed, and includes a body generally shaped to be engaged by a pick-up truck bed. The body naturally has four corners including a front right, a front left, a rear right and a rear left where four support jacks are coupled to the corners of the camper such that each corner is coupled to one support jack. Further, the support jacks operable to be extended to support the body of the camper on the four jacks.

With such a camper, a plurality of stabilization braces for providing stabilization support to the camper body and jacks may be included. Each of the plurality of stabilization braces has two ends such that one end of each stabilization brace is coupled to one of the four jacks and the second end of each stabilization brace is coupled to the body of the camper.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A camper stabilization system, comprising:

a plurality of jacks operable to be coupled to a camper at respective coupling points, the plurality of jacks supporting the weight of the camper when coupled to the camper and secured such that the jacks may not be maneuvered without uncoupling the jacks;

at least one first stabilization brace coupled to at least one jack and coupled to the camper such that the stabilization brace is coupled to a portion of the at least one jack other than the coupling point of the at least one jack to the camper and such that the stabilization brace is coupled to the camper at a point located on the lowest underside of the camper that resides within a truck bed when the camper is engaged with a truck bed; and at least one storage tube having a telescoping point rotatably coupled to the at least one stabilization brace, the storage tube disposed on the camper adjacent to the at least one jack such that the at least one stabilization brace is operable to be fully detached from the at least one jack and rotated about a swivel point at the telescoping point when fully extended from the telescoping point and stored in the storage tube completely separate from the corresponding jack when fully retracted at the telescoping point.

2. The camper stabilization system of claim 1 wherein the plurality of jacks comprise telescoping jacks having an adjustable length.

3. The camper stabilization system of claim 1 wherein the stabilization brace comprises a rigid adjustable length member anchored at a swivel point having a rotatable seating at the camper coupling point and operable to engage the at least one jack at an end opposite the rotatable anchor point.

4. The camper stabilization system of claim 3 wherein the adjustable length member comprises a threaded screw member and a threaded bolting member that when engaged with other will increase the length of the stabilization brace when rotated opposite each other in a first direction of rotation and will decrease the length of the stabilization brace when rotated opposite each other in a second direction of rotation.

5. The camper stabilization system of claim 1 wherein the stabilization brace is coupled to the at least one jack via a clamping mechanism operable to securely engage the at least one jack.

6. The camper stabilization system of claim 1, further comprising at least one second stabilization brace coupled to at least one second jack and coupled to the camper such that the second stabilization brace is coupled to a portion of the at least one second jack other than the coupling point of the at least one second jack to the camper and such that the second stabilization brace is coupled to the camper at a point other than the coupling point of the at least one second jack to the camper.

7. The camper stabilization system of claim 1 wherein the camper is operable to be engaged by a pickup truck bed such that the plurality of jacks and stabilization brace may be stored in storage positions that do not interfere with the operation of the pickup truck and do not hinder the engaging of the camper.

8. A camper stabilization bracing system, comprising:

a first stabilization brace for providing stabilization support to a camper supported by a plurality of secured non-maneuverable jacks, the first stabilization brace having a first end coupled to the camper at a point located on the lowest underside of the camper that resides within a truck bed when the camper is engaged with a truck bed and having a second end coupled to a first jack such that an axis of the first stabilization brace is at an angle with respect to the an axis of the first jack;

a second stabilization brace for providing stabilization support to the camper, the second stabilization brace having a first end coupled to the camper and having a second end coupled to a second jack such that an axis of the second stabilization brace is at an angle with respect to the an axis of the second jack; and at least one storage tube having a telescoping point rotatably coupled to the at least one stabilization brace, the storage tube disposed on the camper adjacent to the at least one jack such that the at least one stabilization brace is operable to be fully detached from the at least one jack and rotated about a swivel point at the telescoping point when fully extended from the telescoping point and stored in the storage tube completely separate from the corresponding jack when fully retracted at the telescoping point.

9. A camper operable to be engaged by a pickup truck bed, the camper comprising:

a body generally shaped to be engaged by a pick-up truck bed, the body having four corners including a front right, a front left, a rear right and a rear left;

four support jacks coupled to corners of the camper such that each corner is coupled to one support jack, the support jacks operable to be extended to support the body of the camper on the four jacks;

a plurality of stabilization braces for providing stabilization support to the camper body and jacks, each of the plurality of stabilization braces having two ends such that one end of each stabilization brace is coupled to one of the four jacks and the second end of each stabilization brace is coupled to the body of the camper at a respective points located on the lowest underside of the camper that resides within a truck bed when the camper is engaged with a truck bed; and a plurality of storage tubes having a telescoping points rotatably coupled to the at least one stabilization brace, the storage tubes disposed on the camper adjacent to at least one jack such that the at least one stabilization brace is operable to be fully detached from the adjacent jack and rotated about a swivel point when fully extended from the respective telescoping point and stored in the storage tube completely separate from the corresponding jack when fully retracted at the telescoping point.

10. The camper of claim 9 wherein each jack is coupled to at least one stabilization brace.

* * * * *